(12) United States Patent
Liu et al.

(10) Patent No.: US 10,922,882 B2
(45) Date of Patent: Feb. 16, 2021

(54) TERRAIN GENERATION SYSTEM

(71) Applicant: Electronic Arts Inc., Redwood City, CA (US)

(72) Inventors: Han Liu, San Francisco, CA (US); Yiwei Zhao, Sunnyvale, CA (US); Mathieu Guindon, Montreal (CA); Mohsen Sardari, Redwood City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronics Arts Inc., Redwood City, CA (US)

( * ) Notice: Subject to any disclaimer, the term of this patent is extended or adjusted under 35 U.S.C. 154(b) by 78 days.

(21) Appl. No.: 16/271,655

(22) Filed: Feb. 8, 2019

(65) Prior Publication Data

US 2020/0129862 A1   Apr. 30, 2020

Related U.S. Application Data

(60) Provisional application No. 62/751,496, filed on Oct. 26, 2018.

(51) Int. Cl.
*G06T 17/05* (2011.01)
*A63F 13/63* (2014.01)
(Continued)

(52) U.S. Cl.
CPC ............. *G06T 17/05* (2013.01); *A63F 13/63* (2014.09); *A63F 13/85* (2014.09); *G06N 3/084* (2013.01);
(Continued)

(58) Field of Classification Search
None
See application file for complete search history.

(56) References Cited

U.S. PATENT DOCUMENTS

| | | | | |
|---|---|---|---|---|
| 7,680,350 B2* | 3/2010 | Baxes | ..................... | G06T 17/20 382/248 |
| 8,953,872 B2* | 2/2015 | Shin | ........................ | G06T 15/04 382/154 |

(Continued)

OTHER PUBLICATIONS

Author: Smelik et al.; Title: Declarative Terrain Modeling for Military Training Games; Date: 2010; Source: https://dl.acm.org/doi/pdf/10.1155/2010/360458 (Year: 2010).*

(Continued)

*Primary Examiner* — Jwalant Amin
(74) *Attorney, Agent, or Firm* — Knobbe, Martens, Olson & Bear, LLP

(57) ABSTRACT

Embodiments of the systems and methods described herein provide game terrain generation system that can generate height field data from a sketch of graphical inputs from a user via a graphical user interface. The game terrain generation system can use a model, such as a trained neural network, to apply macro and micro topological features on top of the height field data to generate game terrain data. The game terrain generation system can identify boundaries between different styles of terrain and generate transitions between the styles to create a more realistic terrain boundary.

20 Claims, 18 Drawing Sheets

(51) Int. Cl.
*A63F 13/85* (2014.01)
*G06N 3/08* (2006.01)
*G06T 19/20* (2011.01)

(52) U.S. Cl.
CPC ...... *G06T 19/20* (2013.01); *A63F 2300/6018* (2013.01)

(56) References Cited

U.S. PATENT DOCUMENTS

| | | | |
|---|---|---|---|
| 9,669,296 B1 | 6/2017 | Hibbert et al. | |
| 9,760,837 B1* | 9/2017 | Nowozin | G06T 7/521 |
| 9,782,668 B1 | 10/2017 | Golden et al. | |
| 10,115,240 B2* | 10/2018 | Lane | A63F 13/52 |
| 10,304,241 B2* | 5/2019 | Gain | G06T 17/05 |
| 10,369,472 B1 | 8/2019 | Mattar et al. | |
| 2002/0090985 A1 | 7/2002 | Tochner et al. | |
| 2005/0253843 A1* | 11/2005 | Losasso Petterson | G06T 15/10 345/428 |
| 2006/0223635 A1 | 10/2006 | Rosenberg | |
| 2007/0021166 A1 | 1/2007 | Mattila | |
| 2007/0280528 A1* | 12/2007 | Wellington | G06T 17/05 382/154 |
| 2008/0146338 A1 | 6/2008 | Bernard et al. | |
| 2009/0005140 A1 | 1/2009 | Rose et al. | |
| 2010/0306825 A1 | 12/2010 | Spivack | |
| 2012/0264518 A1 | 10/2012 | Rouille | |
| 2013/0300740 A1* | 11/2013 | Snyder | G06F 3/016 345/420 |
| 2014/0278847 A1 | 9/2014 | Gallo | |
| 2014/0354630 A1* | 12/2014 | Kim | G06T 17/00 345/419 |
| 2018/0075602 A1* | 3/2018 | Shen | G06T 7/50 |
| 2018/0240263 A1* | 8/2018 | Courter | G06T 15/005 |
| 2018/0245922 A1* | 8/2018 | Zaphir | G01C 21/3461 |
| 2019/0251398 A1* | 8/2019 | Godwin, IV | G06K 9/6262 |
| 2019/0392596 A1* | 12/2019 | Yang | G06K 9/00657 |
| 2020/0013176 A1* | 1/2020 | Kang | G06N 3/0454 |
| 2020/0030700 A1 | 1/2020 | Mattar et al. | |

OTHER PUBLICATIONS

Hecht et al. "Automatic identification of building types based on topographic databases—a comparison of different data sources," Intl J of Cartograph (2015) vol. 1:1(18-31).

* cited by examiner

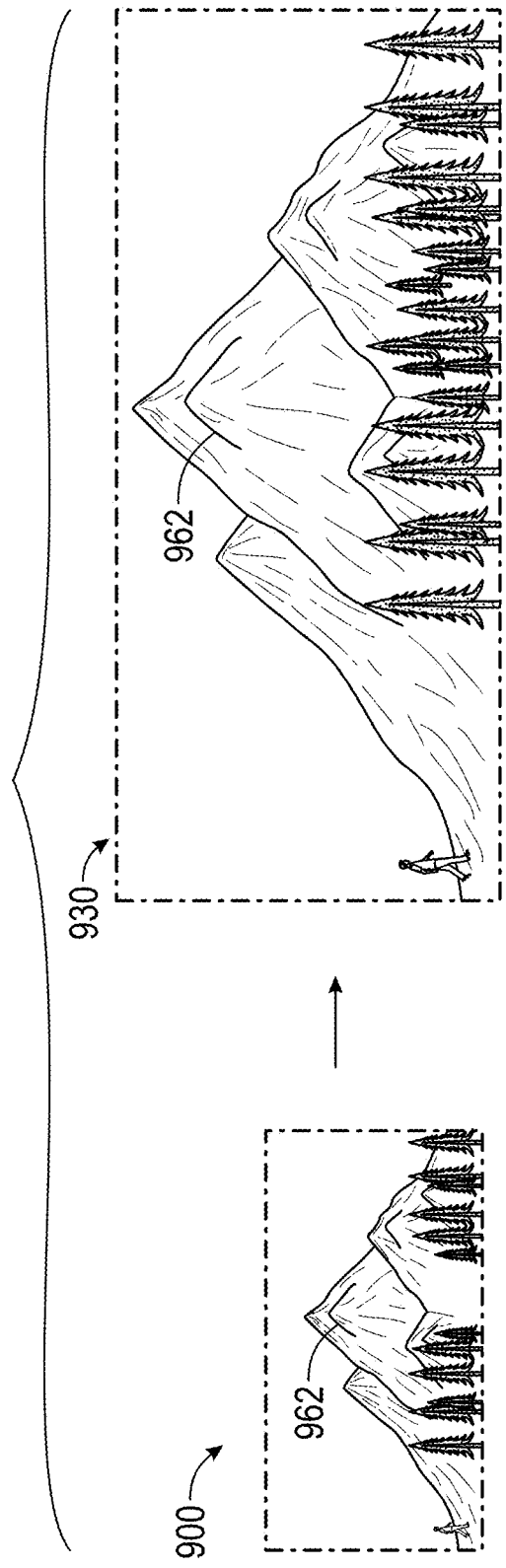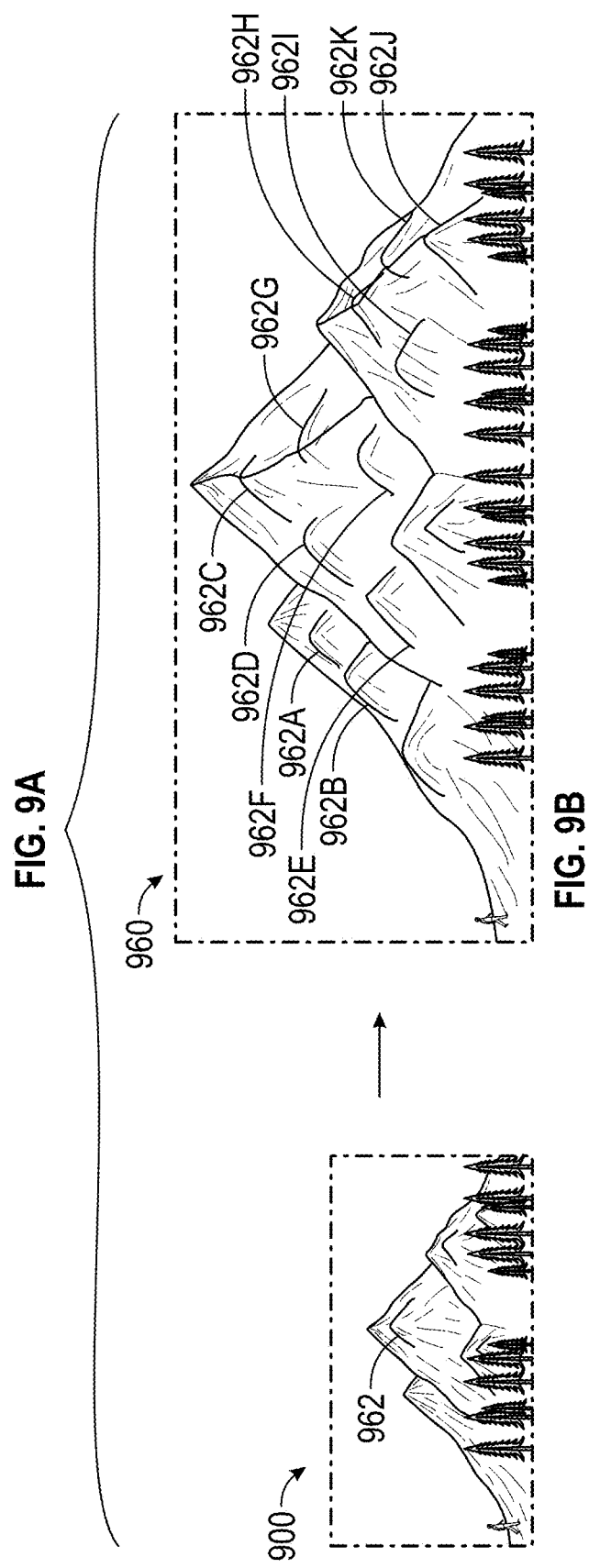

TERRAIN GENERATION SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video games have featured three-dimensional (3D) terrain since the earliest 3D graphics. In order to create terrain for a game world, developers manually create all the terrain. In some instances, the process can be improved by using to public LIDAR data to generate 3D models of real world terrain. However, the developers must manually incorporate the terrain and modify the terrain to match the terrain of the game world. This can be a very lengthy and time consuming process. There is a need to effectively and efficiency enable game developers to generate 3D terrain for use within game worlds.

SUMMARY OF EMBODIMENTS

The systems, methods, and devices of this disclosure each have several innovative aspects, no single one of which is solely responsible for the all of the desirable attributes disclosed herein.

One embodiment discloses a method for generating game terrain data of a game application within a graphical user interface, wherein the method includes: generating instructions to display a graphical user interface on a user computing system, the graphical user interface comprising a drawing interface for a user to generate graphical inputs, wherein each type of graphical input is associated with a terrain characteristic; receiving, from the user system, a terrain drawing through the drawing interface for generation of a first terrain area, the terrain drawing including, at least, a first graphical input and a second graphical input, wherein the first graphical input corresponds to a first terrain characteristic and the second graphical input corresponds to a second terrain characteristic; receiving, from the user system, a selection of a first style of terrain for the first terrain area; inputting the terrain drawing into a neural network, wherein the neural network is trained to generate a height field for the first style of terrain; receiving an output of the neural network that includes a first height field for the first terrain area generated based at least in part on the first graphical input and the second graphical input, wherein the first height field for the first terrain area corresponds to a relationship between a first height associated with the first terrain characteristic and a second height associated with the second terrain characteristic; and generating a three dimensional game terrain model based on the first height field and the first style of terrain.

In some embodiments, the first style of terrain includes one or more landform details specific to a first biome.

In some embodiments, generating the three dimensional game terrain model includes applying the first style of terrain to the first height field data.

In some embodiments, the method further comprises: receiving, from the user system, a selection of a second terrain area; and applying a second terrain style to the second terrain area, wherein the second terrain style includes one or more landform details specific to a second biome.

In some embodiments, the method further comprises: identifying a boundary of the second terrain area; and generating a transition between the first biome and the second biome at the boundary.

In some embodiments, generating the transition is based on a weighting.

In some embodiments, generating the transition is based on a poisson image editing.

In some embodiments, the terrain characteristic includes a height.

In some embodiments, the user system generates the graphical inputs onto a 2-dimensional representation of the area.

In some embodiments, each of the graphical inputs correspond to a specific color.

Some embodiments disclose a system for generating game terrain data of a game application within a graphical user interface, wherein the system includes: one or more processors configured with computer executable instructions that configure the one or more processors to: generate instructions to display a graphical user interface on a user computing system, the graphical user interface comprising a drawing interface for a user to generate graphical inputs, wherein each type of graphical input is associated with a terrain characteristic; receive, from the user system, a terrain drawing through the drawing interface for generation of a first terrain area, the terrain drawing including, at least, a first graphical input and a second graphical input, wherein the first graphical input corresponds to a first terrain characteristic and the second graphical input corresponds to a second terrain characteristic; receive, from the user system, a selection of a style of terrain for the first terrain area; input the terrain drawing into a first machine learning model, wherein the first machine learning model generates a height field for the style of terrain; receive an output of the first machine learning model that includes a first height field for the first terrain area generated based at least in part on the first graphical input and the second graphical input, wherein the first height field for the first terrain area corresponds to a relationship between a first height associated with the first terrain characteristic and a second height associated with the second terrain characteristic; and generate a three dimensional game terrain model based on the first height field and the style of terrain.

In some embodiments, the first machine learning model includes a neural network.

In some embodiments, the first machine learning model is trained using predefined inputs for desired heights and an expected height field output.

In some embodiments, the first machine learning model is trained using back propagation.

In some embodiments, the first machine learning model is trained using LIDAR data.

In some embodiments, the first machine learning model is trained for a plurality of biomes.

In some embodiments, the first machine learning model is used for a first biome and a second machine learning model is used for a second biome.

Some embodiments include a non-transitory computer-readable storage medium having stored thereon instructions that, when executed, cause at least one processor to: generate instructions to display a graphical user interface on a user computing system, the graphical user interface comprising a drawing interface for a user to generate graphical inputs, wherein each type of graphical input is associated with a terrain characteristic; receive, from the user system, a terrain drawing through the drawing interface for generation of a first terrain data, the terrain drawing including, at least, a first graphical input and a second graphical input, wherein the first graphical input corresponds to a first terrain characteristic and the second graphical input corresponds to a second terrain characteristic; receive, from the user system, a selection of a style of terrain for the first terrain area; input the terrain drawing into a machine learning model, wherein the machine learning model generates a height field for the style of terrain; receive an output of the first machine learning model that includes a first height field for the first terrain area generated based at least in part on the first graphical input and the second graphical input, wherein the first height field for the first terrain area corresponds to a relationship between a first height associated with the first terrain characteristic and the second height associated with the second terrain characteristic; and generate a three dimensional game terrain model based on the first height field and the style of terrain.

In some embodiments, the first machine learning model is used for a first biome and a second machine learning model is used for a second biome.

In some embodiments, to generate the three dimensional game terrain model includes maintaining relative sizes of landform characteristics for the style of terrain.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 9A illustrates an embodiment of a mountainous region interpolated into a larger sized region according to some embodiments.

FIG. 9B illustrates an embodiment of characteristics of a mountainous region applied to a larger sized region while maintaining landform characteristics according to some embodiments.

DETAILED DESCRIPTION OF EMBODIMENTS

Overview

Figure 1:
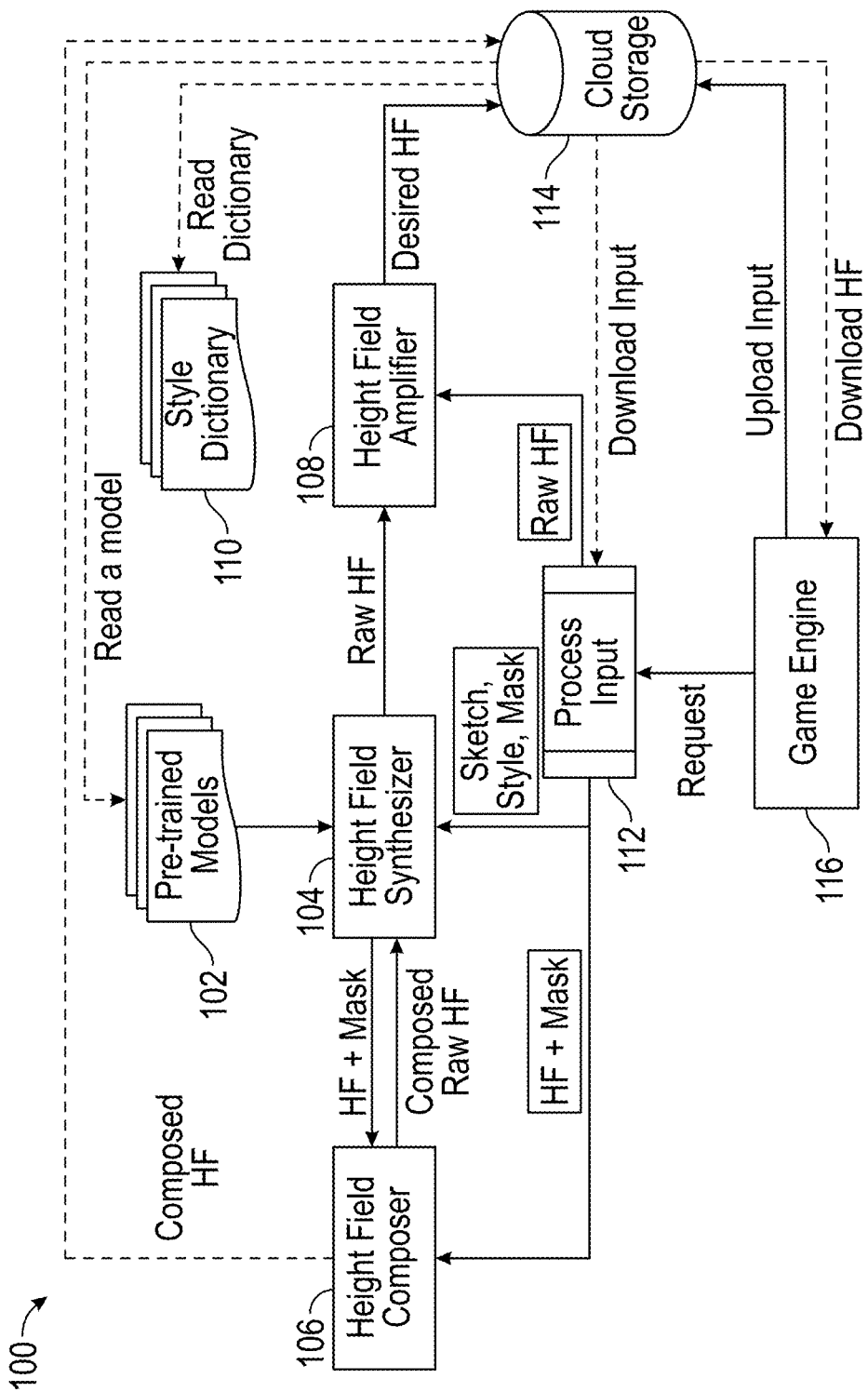
FIG. 1 illustrates an embodiment of a block diagram of a terrain generation system.

Some embodiments of the present disclosure include a terrain generation system. The terrain generation system can include a height field synthesizer (HFS) that can use a pre-trained model to translate a sketch to a raw height field, preserving macro topological features provided in the sketch, such as mountain ridges. The sketch can be input by a user via a graphical user interface, where the sketch includes certain graphical inputs associated with terrain characteristics. For example, a graphical input of one color can be associated with a high altitude and a graphical input of another color can be associated with a low altitude. The user can generate a sketch of desired heights or other terrain features. The HFS can receive the sketch and generate a raw height field.

The terrain generation system can receive a selection of a desired style of terrain from the user, and the HFS can identify a corresponding pre-trained model for the style of terrain. For example, the terrain generation system can receive a forest style of terrain, and the HFS can identify a pre-trained model trained to generate height fields for forest style of terrains. The sketch can be input into the pre-trained model, and the pre-trained model can output a raw height field that corresponds to a forest style of terrain, and that corresponds to the terrain characteristics associated with the graphical inputs in the sketch.

The HFA can build a landform library from real terrain data, encoding micro geomorphic features that can be transferred to a raw height field, allowing level designers to control terrain styles. The HFA can add geomorphic features, such as landform features, onto the height field, allowing level designers to control terrain styles. For example, for a forest style of terrain, the HFA can overlay geomorphic features onto the height field, such as landslides, debris flow, bank erosion, and the like.

Further, the HFC can stitch different LIDAR pieces together, together with HFA, it can create natural transitions along the boundaries of different biome pieces to produce a realistic mixed-biome terrain. The HFC can create the natural transitions using Poisson image editing and/or a weighting mechanism. The HFC can identify boundaries between different terrain styles, such as a mountainous and an open plain style, and generate natural transitions of altitude between the peaks of the mountains and the open plains. The HFC can identify that the mountains include a style with tall trees but that the open plain style has small bushes. The HFC can then generate medium sized trees and/or bushes along the boundaries.

Some embodiments of the present disclosure include systems and methods that can use high-quality LIDAR data from real terrain, such as mountain ranges. The data can be passed through a deep neural network, which is trained to create terrain-building algorithms. The system can create an algorithm which will be available within the platform's development toolbox. The platform's development toolbox can include a style of terrain, such as a forest, a desert, or a volcanic style of terrain. The system can identify the corresponding algorithm, such as a deep neural network, that is trained for the selected style of terrain using the LIDAR data. Then, the system can input the sketch into the algorithm to generate a height field corresponding to the selected style of terrain. Within this AI-assisted terrain generation, designers can generate within seconds, not just a single mountain, but a series of mountains and all of the surrounding environment with the realism of actual mountain ranges.

The terrain generation system can provide an efficient terrain authoring tool, that assists game designers prototyping their ideas in a simpler and faster way. The terrain generation system can provide a non-destructive alternative to the current LIDAR-import workflow. In the current LIDAR workflow, LIDAR data is captured, and the LIDAR data would have to be manually revised and molded to fit the landscape of the game world that the game developer desires. The game developer would need to manually identify portions of relevant LIDAR data, capture snippets of the relevant LIDAR data, and overlap the snippets onto the area of interest in the virtual space. Moreover, manually placing these snippets of LIDAR data would cause inconsistencies along the boundaries of the snippets.

The terrain generation system of the present disclosure can be seamlessly integrated into the existing terrain procedural amplification in game engines. The terrain generation system can provide the ability to author mixed biome terrain for massive open-world game creation.

Terrain Generation System

FIG. 1 provides an embodiment of a terrain generation system 100. The terrain generation system 100 can include a height field synthesizer (HFS) 104, a height field amplifier (HFA) 108, a height field composer (HFC) 106, a game engine 116, a storage 114, such as a cloud storage, pre-trained models 102, and/or a style dictionary 110.

In some embodiments, the HFS 104 can use a pre-trained model from stored pre-trained models 102 that translates a graphical input from a user, such as a sketch, to a raw height field, preserving macro topological features extracted from the user input, such as mountain ridges. The graphical input can be received by the process 112 and can include different types of graphical inputs that can define different types of macro topical features, such as ridges and valleys. The HFS can receive a sketch from a user that includes graphical inputs corresponding to terrain characteristics. For example, one graphical input may correspond to a desired height in an area, and another graphical input may correspond to another desired height in a different area. Then, a pre-trained model can translate the sketch to identify and overlay macro topological features onto the sketch to create height field data. In some embodiments, the pre-trained model can correspond to a specific terrain style. For example, the model can correspond to a mountain style, and the macro topological features can include height field data of mountains that correspond to desired heights based on the sketch.

In some embodiments, the HFA 108 can build a landform library from real terrain data, encoding micro geomorphic features (also referred to as landform features) that can be transferred to a raw height field, allowing level designers to control terrain styles. The HFA 108 can dynamically add the landform features to the raw height field generated by the HFS 104. The landforms can be overlayed on top of the height field data based on landforms found in the landform library for a particular style of terrain. In some embodiments, the HFA 108 can use an algorithm, such as a neural network trained for the style of terrain, to overlay landforms over the height field data. The neural network can be trained to identify optimal locations for landforms based on height field data.

In some embodiments, the HFC 106 can stitch different LIDAR pieces together using poisson image editing. Together with HFA 108, the HFC 106 can create natural transitions along the boundaries of different biomes to produce a realistic mixed-biome terrain. The HFC 106 can identify boundaries of different biomes, such as a boundary between a mountainous style and a desert style. The HFC 106 can generate macro and micro topological features between the boundaries to create a natural transition between the boundaries. For example, the HFC 106 can generate the natural transition data based on a weighting of macro and micro topological features along the boundaries.

The terrain generation system 100 can include a storage 114, such as a cloud storage. The electronic storage 114 may include electronic storage media that electronically stores information. Electronic storage 114 may store software algorithms, information determined by various processors, such as the processors associated with the HFS 104, the HFA 108, or the HFC 106, information received remotely, information received from server(s), information received from client computing platforms, information received from game developer systems, and/or other information that enables systems and/or server(s) to function properly. For example, electronic storage 114 may store information relating to an online game, information relating to a game instance of an online game, information relating to virtual reality platforms and non-virtual reality platforms, information relating to objectives, information relating to rewards, information relating to one or more computer components, information related to game development environments, and/or other information.

The terrain generation system 100 can include pre-trained models 102. In some embodiments, each terrain biome can be associated with a pre-trained model. The pre-trained model can be trained using one or more machine learning algorithms ("ML model"), such as a deep neural network. The ML model can determine macro topological terrain characteristics associated with each biome. The ML model can be used to generate the height field for the terrain based on user input. The ML model can be trained to using different types of graphic properties that are associated with specific characteristics of the terrain. Based on the graphic properties provided by the user and fed into the ML models, the HFA 108 and HFS 104 can dynamically generate terrain for the user for the specified type biome. The pre-trained model can be used to generate game terrain data including micro topological features overlayed on height field data. In some embodiments, the pre-trained model can generate game terrain data that includes macro and/or micro topological features based on a sketch input by the user including graphical inputs.

The terrain generation system 100 can include a style dictionary 110. In some embodiments, the style dictionary 110 can include landform features that are generated during the ML process. The landform detail are used to apply detail to the generated height field. The landform details can be specific to a biome, and can be used to populate the height field and add detail to the generated height field.

In some embodiments, the game developers can generate an image that provides a 2D sketch of a terrain. The image can be formed using a drawing, such as a line or circle drawing, where each line can be associated with a graphic property, such as line color, pattern, thickness or other graphic property. Each graphic property is associated with a terrain characteristic. For example, the terrain generation system associate different terrain characteristics with different properties. During model training, the terrain characteristics can be associated with the specific graphic properties. The terrain generation system may be configured to associate the terrain characteristics with the properties after the training is complete.

Terrain Generation Flow Diagram

Figure 2:
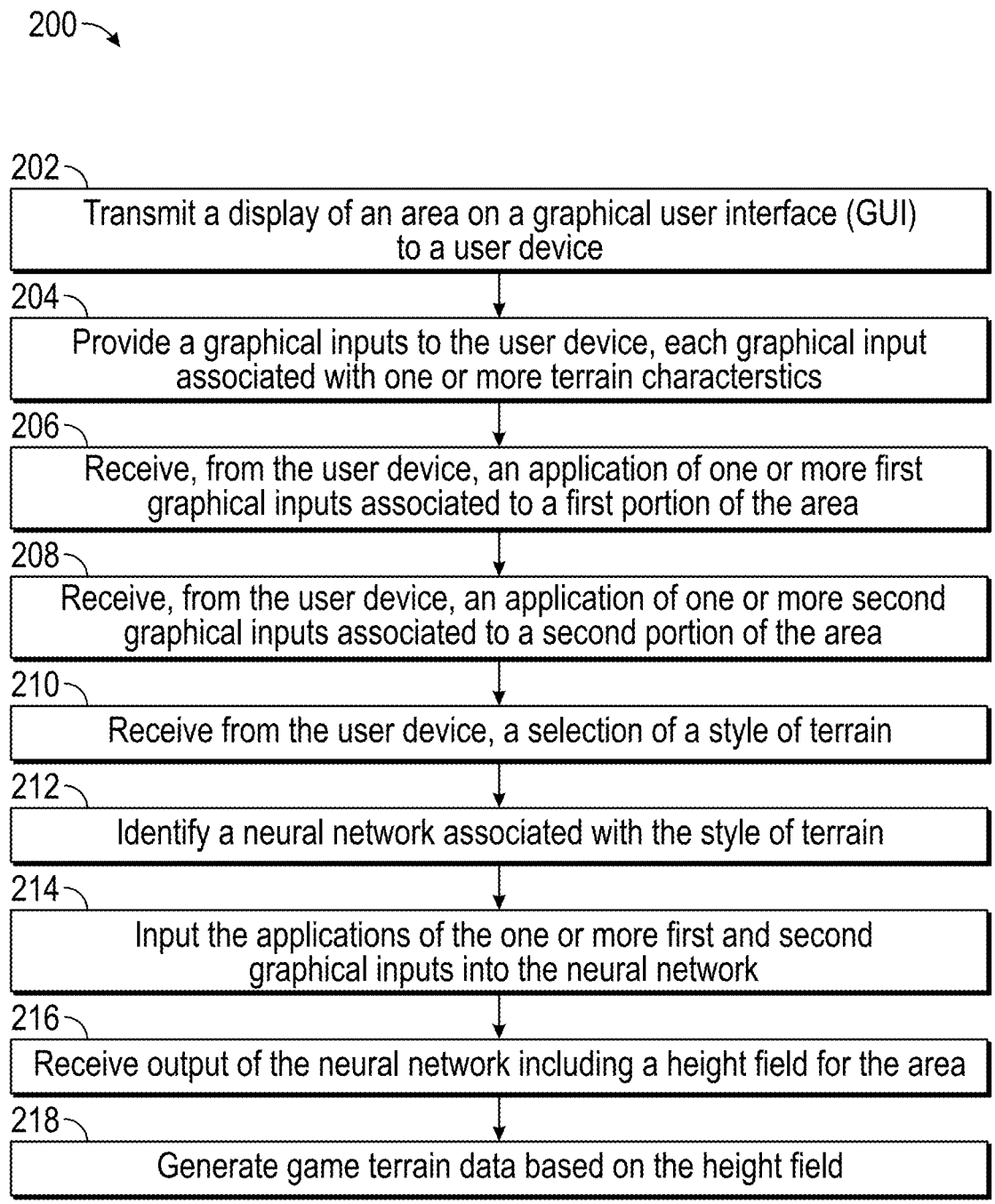
FIG. 2 illustrates an embodiment of a flow diagram 200 of a terrain generation system.

FIG. 2 illustrates an embodiment of a flow diagram 200 of a terrain generation system for generating game terrain data based on a sketch generated from graphical inputs. The process 200 can be implemented by any system that can generate a height field from a sketch of graphical inputs. For example, the process 200, in whole or in part, can be implemented by the height field synthesizer 103, the height field amplifier 108, the height field composer 106, or other computing system. Although any number of systems, in whole or in part, can implement the process 200, to simply discussion, the process 200 will be described with respect to particular systems. Further, although embodiments of the process 200 may be performed with respect to variations of systems comprising various game development environments, to simply discussion, the process 200, will be described with respect to the terrain generation system 100.

At block 202 the terrain generation system 100 can transmit a display of an area of a graphical user interface (GUI) to a user device. The display can be the application interface for the game developer to develop game terrain for the area. The graphical user interface can be a two dimensional and/or three dimensional representation of an area.

At block 204, the terrain generation system 100 can provide one or more types of graphical inputs, where each type graphical input is associated with one or more terrain characteristics. The graphical inputs can be used to generate a sketch of the terrain. For example, the graphical inputs can include one or more lines, shapes (e.g., a circle, square, triangle, and the like), symbols, patterns, and/or other graphical inputs. The graphical inputs can have graphical property, such as a color, thickness, style (e.g., dashed, solid, etc.), and/or other graphical properties. The graphical inputs with selected graphical properties can correspond to a terrain characteristic. For example, a graphical input of a first color can represent a high altitude and another color can represent a low altitude. A line may represent a ridgeline, whereas a circle may represent a volcano. As another example, a first circle of a first color (which can be the same as or a different color as a high altitude ridgeline) can represent the high altitude portion of the volcano. The user can also draw a second circle within the first circle in a different color to represent the belly of the volcano. In another implementation of this example, the first and second circles may be the same color and the terrain generation system automatically recognizes that nested circles represent a volcano.

The one or more terrain characteristics can be adjusted in the sketch. When the one or more terrain characteristics are adjusted, the terrain generation system 100 can display the adjustment on the generated height field. For example, the user can use a graphical input, such as a line color, a pattern, or a thickness, to indicate a change of the one or more terrain characteristics. For example, a blue color line can represent a high altitude terrain characteristic whereas a red line can represent a low altitude terrain characteristic. The user can generate the sketch with one or more red lines, and later, adjust one of the red lines to a blue line. Then, the generated height field can reflect the change from a low altitude terrain to a high altitude terrain.

At block 206, the terrain generation system can receive, from the user device, an application of one or more graphical inputs of a first type associated with a terrain area. For example, the terrain generation system can receive a blue color line within the terrain area.

At block 208, optionally, the terrain generation system can receive, from the user device, an application of one or more graphical inputs of a second type associated with the terrain area. For example, the terrain generation system can receive a red color line within the terrain area. Although the present process 200 only describes using first and second types of graphical inputs, this is merely representative, and any number of types of graphical inputs (e.g., 10, 20, 100, etc.) can be used when generating a terrain sketch.

At block 210, the terrain generation system can receive, from the user device, a selection of a style of terrain. The styles can be a selection among a list of styles, such as styles available from the styles library. The styles can be associated with a specific biome and can include landform details specific to that biome.

At block 212, the terrain generation system can identify an applicable neural network to apply to the graphical input. The neural network can be specific to a particular style of terrain, such as particular to a biome. For example, the height field synthesizer 104 can identify a neural network that is trained to generate game terrain data for the selected style of terrain. For example, the neural network can be trained to generate a mountainous height field that is based on mountainous LIDAR data (e.g., Sierra Nevada Mountains).

At block 214, the terrain generation system can input the first and second graphical inputs into the neural network, or a derivative output thereof such as a 2-dimensional sketch of the area, and at block 216, the neural network can output a height field for the area.

At block 216, the terrain generation system can generate game terrain data based on the height field. In some embodiments, the height field amplifier 108 can generate the game terrain data. The height field amplifier 108 can receive the height field outputted by the neural network. Then, the height field amplifier 108 can identify landforms corresponding to the style of terrain. The height field amplifier 108 can then overlay the landforms over the height field.

Terrain Generation Example

Figure 3A:
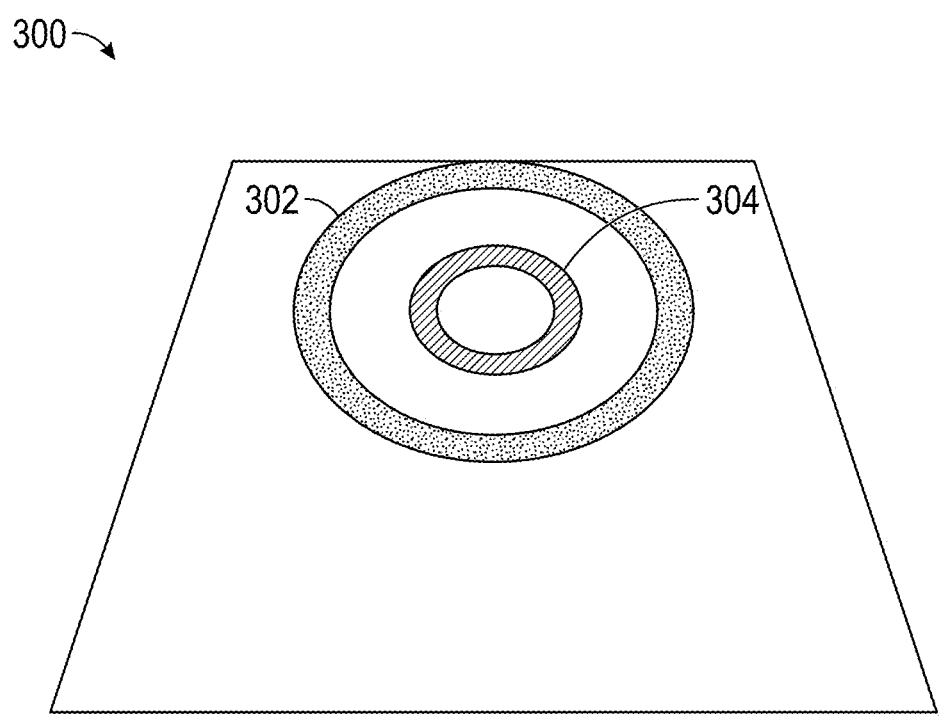
FIGS. 3A-3C illustrate an embodiment of a process for generating 3D terrain from a 2D image.

FIG. 3A illustrates an embodiment of a drawing, or sketch, 300 with a first graphical input having a first graphic property, the outer circle 302 and a second graphical input having a second graphic property, the inner circle 304. The drawing 300 interface can be presented to the user (e.g., game developer) within a graphical user interface of the terrain generation system. The game developer can select from one or more graphical inputs. A user can select a graphical property to draw onto the area. A graphical property can be a property of a graphical input (e.g., a line or a circle) that is drawn by the user. A graphical property can be a thickness, a color, a style of line (e.g. dashed line, solid line, etc.), pattern, or other graphic property. The type of graphical input and/or the graphical property can correspond to a terrain characteristic, such as a height. For example, one color can represent one height, whereas another color can represent another height.

In the example of FIG. 3A, the first graphic property is associated with a first terrain characteristic, such as a ridge, or other high altitude terrain characteristic. The second graphic property is associated with a second terrain characteristic, such as a valley, or other low altitude terrain characteristic. The terrain generation system generates a height field based on the drawing 300 provided by the user. In the illustrated example, the circle 302 having a first graphical property (i.e., the dotted pattern) is associated with a maximum height of a mountain. A circle 304 having a second graphical property (i.e., the lined pattern) is associated with a minimum height of a mountain. The drawing 300 can correspond to a maximum height of a volcano via the first graphical input 302 surrounding a minimum height of an interior portion of the volcano via the second graphical input 304. As further discussed herein, the terrain characteristic can be associated with the type of graphical input, the graphical properties, and/or relationships between the inputs and/or properties. For example, as it relates to this example, the graphical input (i.e., circles) may be used to determine that the type of terrain that will be generated (for example, a volcano, as opposed to a ridgeline), and the minimum and maximum heights of the terrain may be associated with the graphical properties (i.e., patterns). In another instance, the type of terrain (e.g., volcano) and features of the terrain (e.g., min/max heights) may be associated with the graphical properties. In another example, the selection of a volcano may be based on relationships between the graphical inputs (e.g., nested circles results in the formation of a volcano).

Figure 3B:
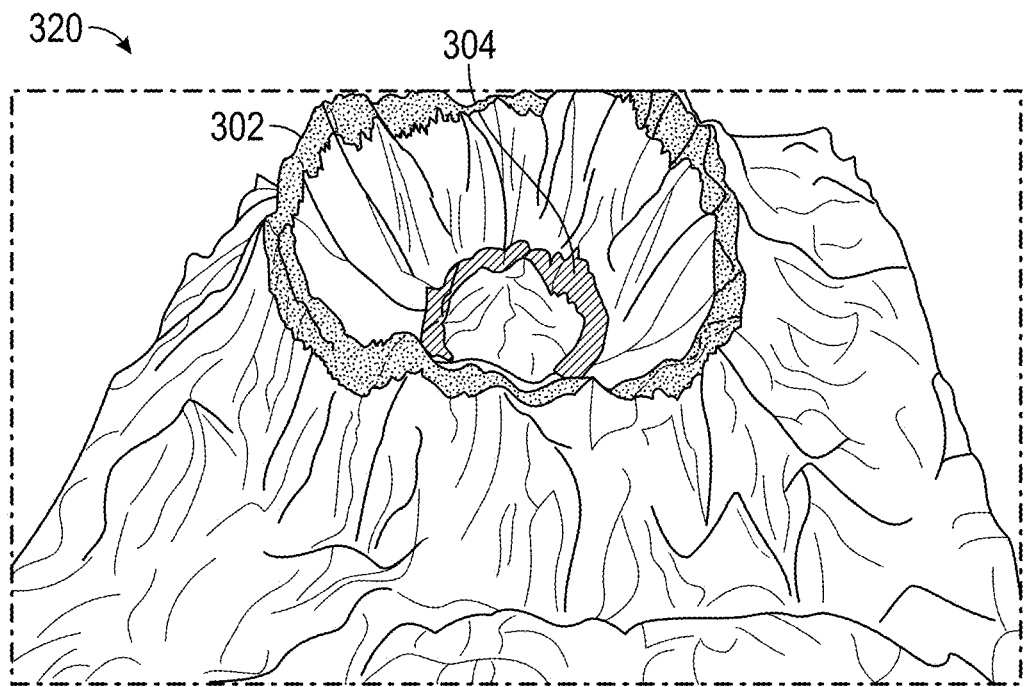
Figure 3C:
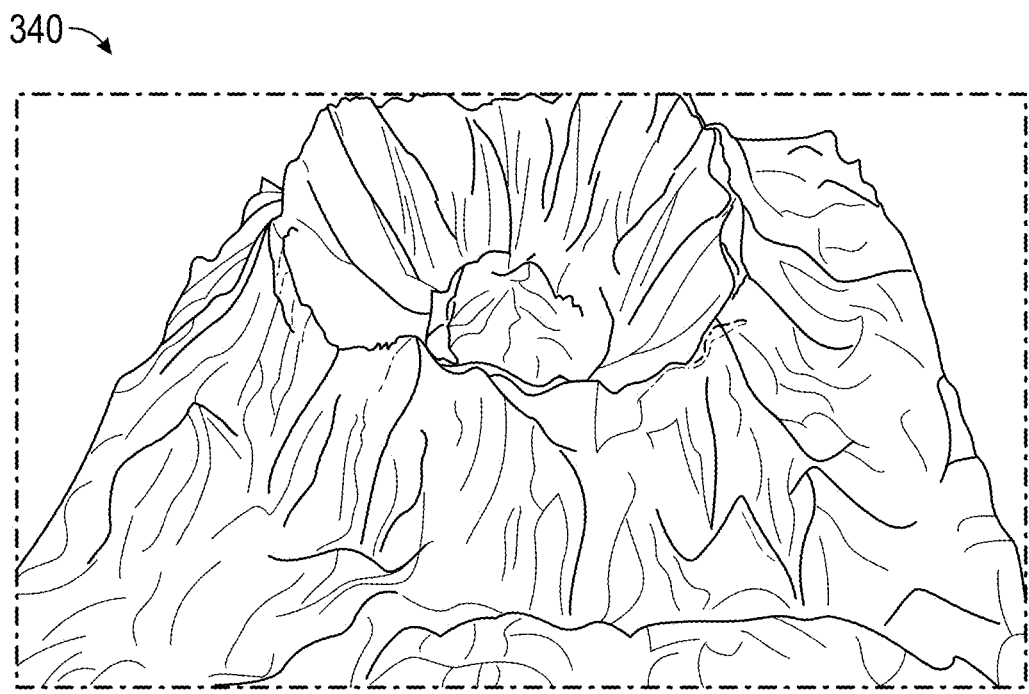

FIG. 3B illustrates an embodiment of the 3D terrain mesh 320 generated based on the image input by the user. The HFS 104 can generate height field data from the sketch 300. The sketch 300 can be input into the HFS 104, the HFS 104 can identify a neural network associated with the selected mountainous style of terrain, and input the sketch 300 into the neural network. The neural network can generate height field data with macro topological features associated with a mountainous style while corresponding to the desired heights based on the first graphical input 302 and the second graphical input 304 in the sketch 300. The HFA 106 can receive the height field data generated by the HFS 104 to overlay micro topological features on top of the height field data to generate the game terrain data as shown in FIG. 3B. FIG. 3C illustrates an embodiment of the generated terrain mesh 340 without the image overlaid on the terrain.

Training the Neural Network

Figure 4A:
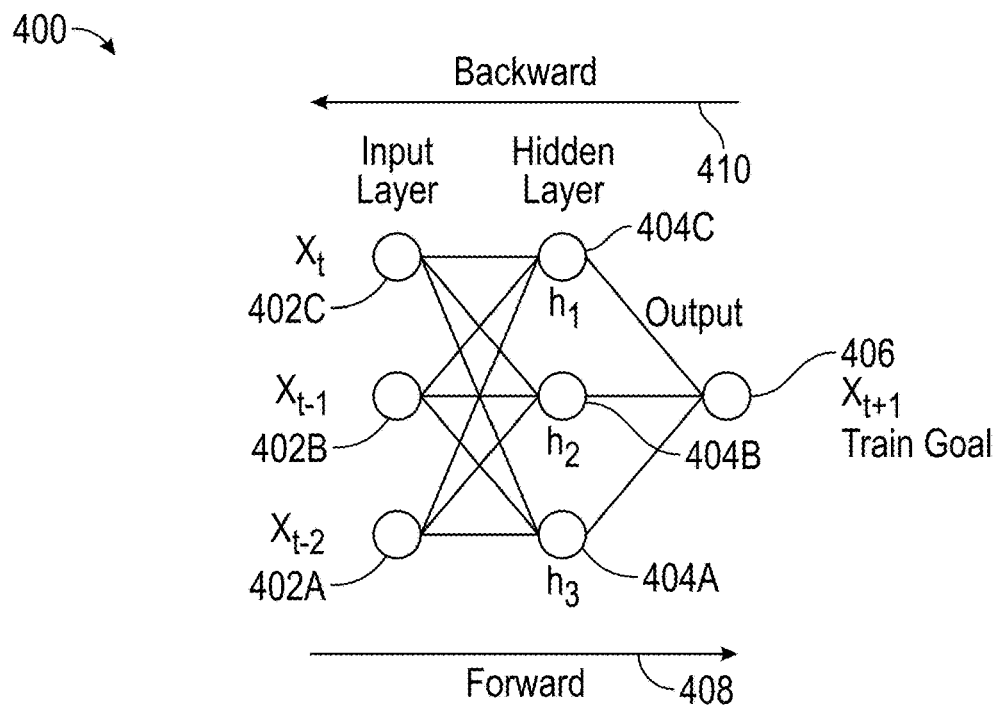
FIG. 4A illustrates an embodiment of training a neural network.

The machine learning models, such as the neural network, can be trained. FIG. 4A illustrates an embodiment of training a neural network. The machine learning model, such as a neural network can be trained, for one or more particular topological terrain characteristics associated with a specific biome. In some embodiments, the neural network is trained for a single biome type. In some embodiments, the neural network is trained for multiple biomes.

In the example of FIG. 4A, the neural network can include input nodes 402A, 402B, 402C ($X_t$, $X_{t-1}$, $X_{t-2}$), hidden layer nodes 404A, 404B, 404C ($h_1$, $h_2$, $h_3$), and one or more output nodes 406 ($X_{t+1}$). The training data can be input into the input nodes 402A, 402B, 402C, the input data processed by the hidden layer nodes 404A, 404B, 404C, and the neural network outputting one or more values at the one or more output nodes 406 ($X_{t+1}$) for forward propagation 408. With training data, an expected output can be checked with the actual output. Then, backpropagation can occur 410, where the weightings are adjusted in the hidden layer nodes 404A, 404B, 404C based on the effect on the output, such as based on the effect caused to a difference in the expected output and the actual output during forward propagation.

Figure 4B:
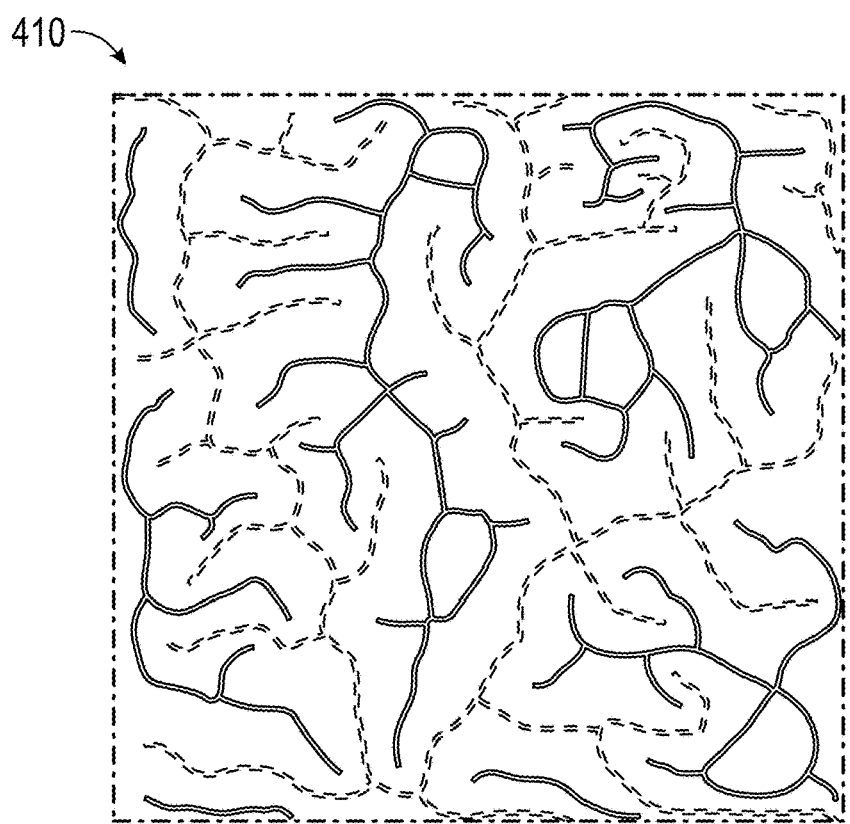
FIGS. 4B-4F illustrate an embodiment of a training process for generating a biome model and generation of 3D terrain using the biome model.
Figure 4C:
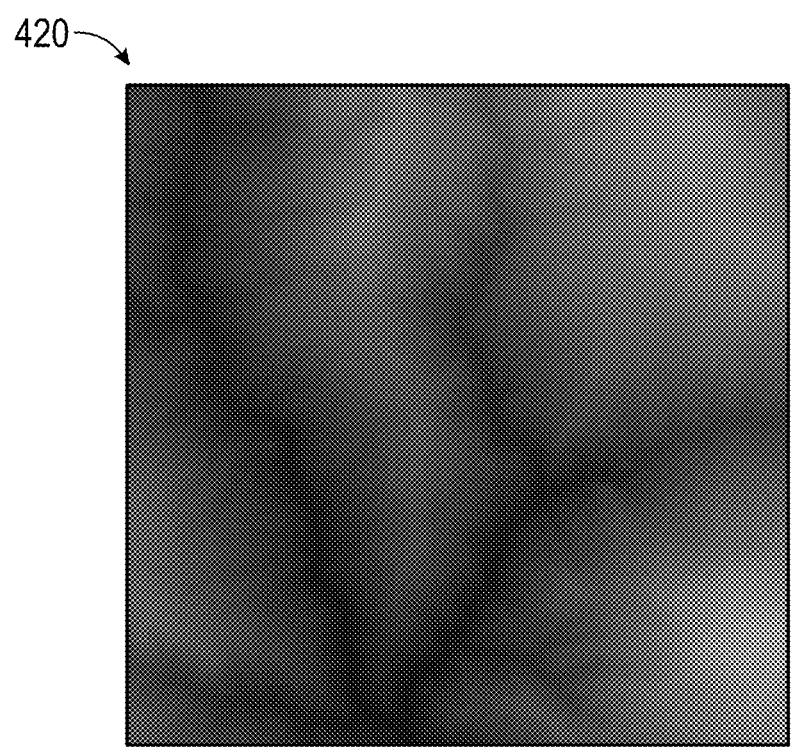

FIGS. 4B and 4C illustrate an embodiment of a training process for generating a model for a biome. The terrain generation system can use machine learning algorithms, such as a deep neural network to generate the models for each biome. The model can be configured to learn macro topographical features and micro topographical features associated with the terrain of a specific biome. Macro topographical features can include larger features, such as mountain ridges and valleys. Micro topographical features can include smaller features, such as landform features. Landform features can include soil aging, weathering, water erosion, desertification, and the like.

Additionally, the model can make correlations between the macro and micro topographical features in order to automatically generate more realistic terrain. For example, the model can determine the types of landform features that are present on a the top of a plateau as compared the features that are present on the steep face of the plateau.

FIGS. 4B and 4C illustrate an embodiment of a data pair that can be used to train the models. The data pair can be generated from LIDAR data. FIG. 4C represents an embodiment of the raw LIDAR data. FIG. 4B represents an embodiment of skeletal data extracted from the terrain features in the raw LIDAR data. The skeletal data can represent macro topographical terrain features, such as ridge lines and valleys. The skeletal data can be extracted automatically from the LIDAR data. Each type of terrain feature can be associated with a different graphic property. The LIDAR data has specific terrain features that are analyzed and learned during training. In FIG. 3A, the skeletal data has been categorized by ridgelines and valleys, which are each represented by lines having different graphic properties. The model can use the data pairs to generate a model for the specific biome.

The model can be configured to recognize characteristics specific to different types of terrain for each biome. For example, mountains and volcanoes have different characteristics. A mountain may include local highs (e.g., peaks), local lows (e.g., valleys), whereas a volcano may include a peak and an opening. A biome may include other types of terrain such as plateaus, river beds, crevices, or any other type of terrain types within the biome. The model can be configured to associate different graphic properties with each of the different types of terrain. For each terrain type, the graphic properties can define different characteristics of that terrain.

Figure 4D:
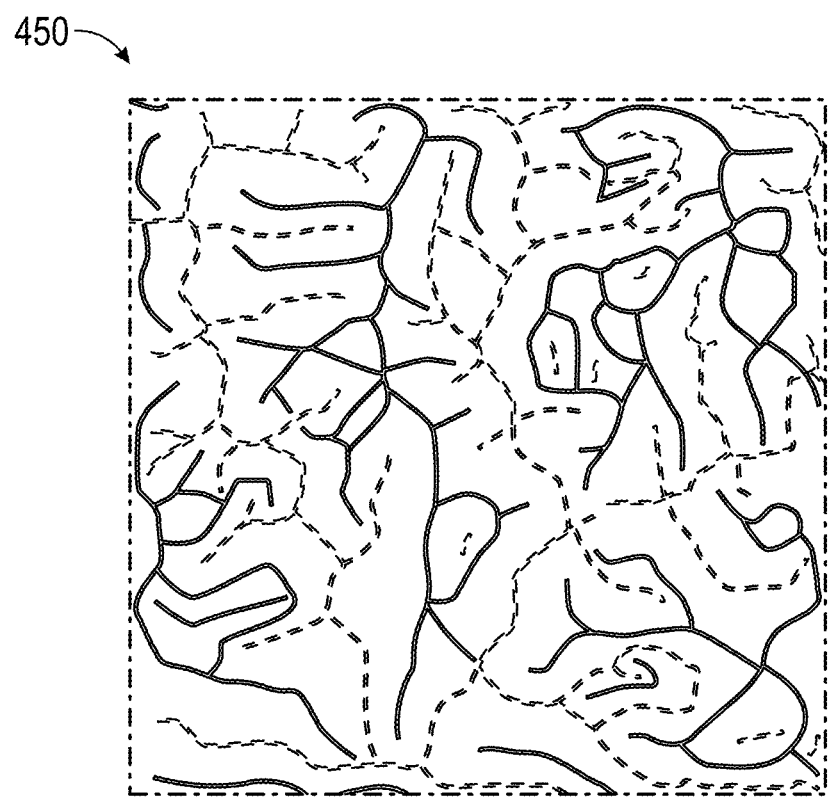
Figure 4E:
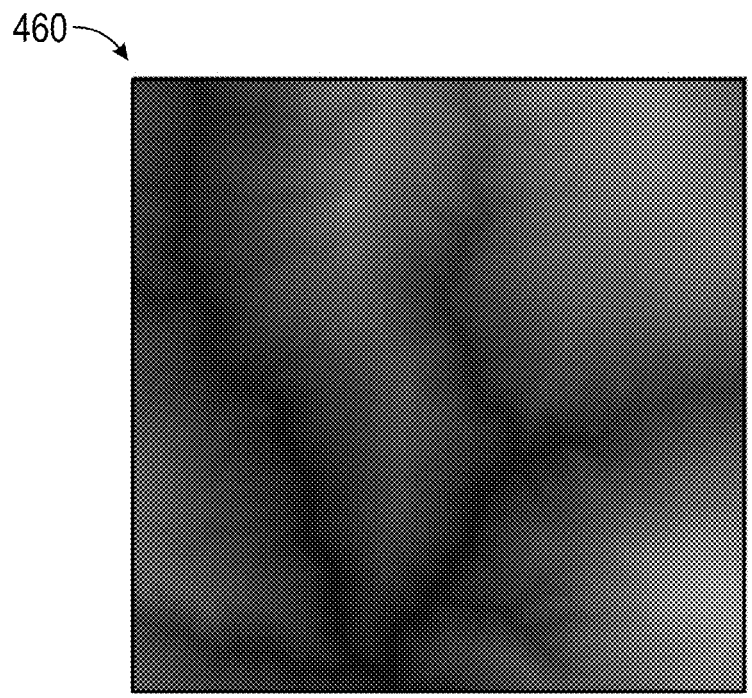
Figure 4F:
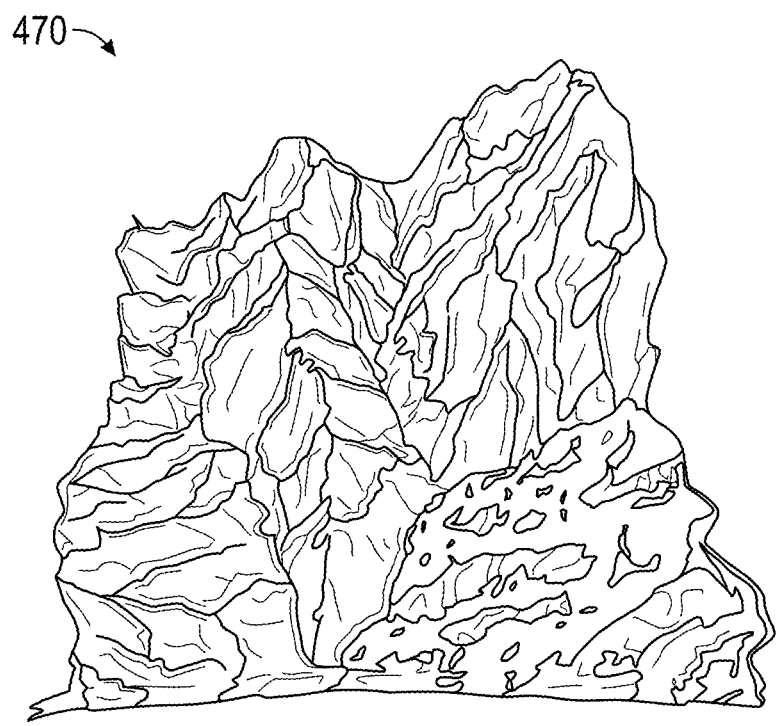

When a user provides the image to the terrain generation system, the terrain generation system can generate the requested terrain based on the model associated with the selected biome. The terrain generation system can generate a raw height field for the specific terrain based on the graphic properties associated with each graphic element within the image. The terrain generation system can then generate the terrain for the biome using the landform features associated with the biome model. The macro and micro topographical features and characteristic of the terrain are automatically and dynamically generated based on the user's 2D image. The terrain generation system can output a fully formed 3D mesh of the generated terrain. FIG. 4D illustrates an embodiment of the 2D image provided by the user. The 2D image can be input into a trained neural network to generate a height field. FIG. 4E illustrates an embodiment of the generated the height field. The terrain generation system can add geomorphic features, via the HFA, onto the height field. FIG. 4F illustrates an embodiment of the generation of a high definition 3D mesh of the terrain including detailed landform features.

Changing Terrain Style

Figure 5:
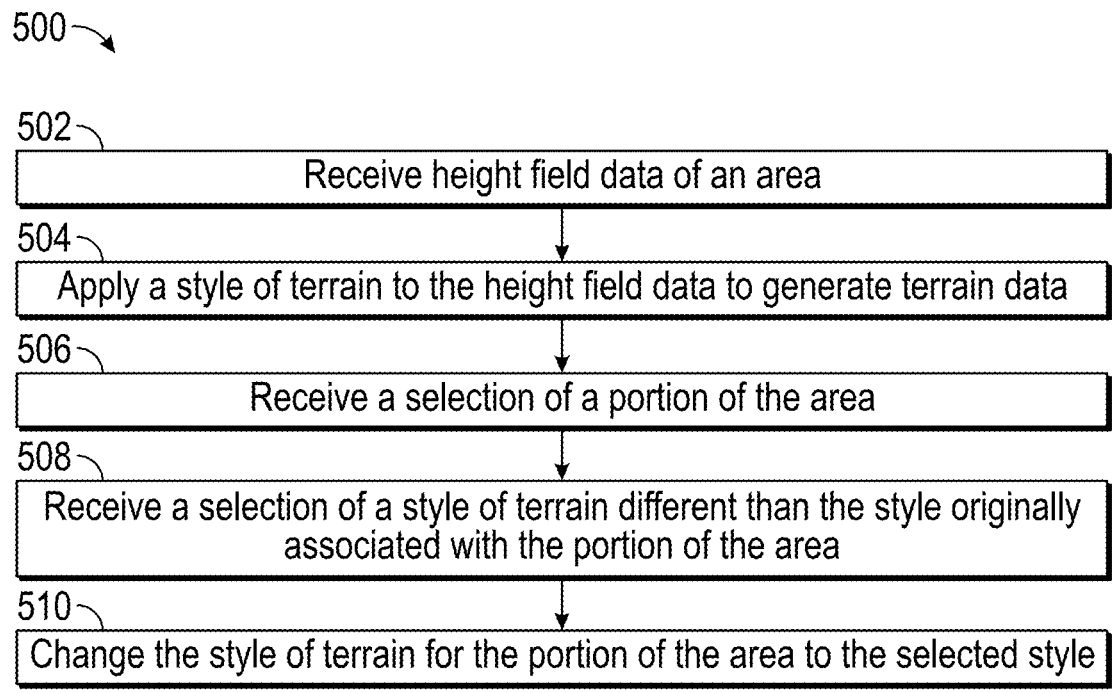
FIG. 5 illustrates an embodiment of a flow diagram for changing a terrain style in a portion of an area.

FIG. 5 illustrates an embodiment of a flow diagram 500 for changing a terrain style in a portion of an area. The process 500 can be implemented by any system that can change a terrain style of an area. For example, the process 500, in whole or in part, can be implemented by the height field synthesizer 103, the height field amplifier 108, the height field composer 106, or other computing system. Although any number of systems, in whole or in part, can implement the process 500, to simply discussion, the process 500 will be described with respect to particular systems. Further, although embodiments of the process 500 may be performed with respect to variations of systems comprising various game development environments, to simply discussion, the process 500, will be described with respect to the terrain generation system 100.

At block 502, the terrain generation system can receive and/or generate height field data for an area. The height field composer can receive a sketch of graphical inputs that indicate terrain characteristics, such as one or more desired heights across an area. The height field composer 106 can input the sketch into a neural network to generate macro topological features provided in the sketch, such as mountain ridges or valleys.

At block 504, the terrain generation system can apply a style of terrain to the height field data to generate terrain data. In some embodiments, a neural network can be used to apply a style of terrain to the height field data. For example, the terrain generation system can apply a neural network to apply landform features of a mountainous style for the area on top of the height field data that was generated at block 502.

In some embodiments, a neural network can be trained to generate height field data with macro topological features based on a sketch of graphical inputs. Each style of terrain can be associated with a neural network that is trained to generate macro topological features for that style of terrain. In some embodiments, a neural network can be trained to generate macro topological features for one or more styles of terrain.

In some embodiments, a neural network can be trained to generate game terrain data that includes landform features of micro topological features on top of the height field data. In some embodiments, a single neural network can be trained to generate game terrain data including landform features of micro topological features and macro topological features based on a sketch of graphical inputs. Each style of terrain can be associated with a neural network that is trained to generate micro topological features for that style of terrain. In some embodiments, a neural network can be trained to generate micro topological features for one or more styles of terrain.

At block 506, the terrain generation system can receive a selection of a portion of the area. For example, the user can select the bottom left portion of the area. At block 508, the terrain generation system can receive a selection of a style of terrain different than the style originally associated with the portion of the area. For example, the original style may be a mountainous style. The user may select to change the selected portion of the area to a desert style. At block 510, the terrain generation system can change the selected portion of the area to a desert style while the remaining area is still the mountainous style of terrain.

Figure 6A:
FIGS. 6A and 6B illustrate an embodiment of how a user can modify terrain features that were previously generated by the terrain generation system.
Figure 6B:

FIGS. 6A and 6B illustrate an embodiment of how a user can modify terrain features that were previously generated by the terrain generation system. The user can select a portion 602 of the terrain, illustrated by the dashed circle, and provide an input to modify the terrain to a different type of terrain feature or to terrain from a different biome. For example, in the illustrated example, the mountain side can be changed to a number of smaller hills. The terrain generation system can generate the new terrain and create terrain transitions between the new and old terrain.

Figure 6C:
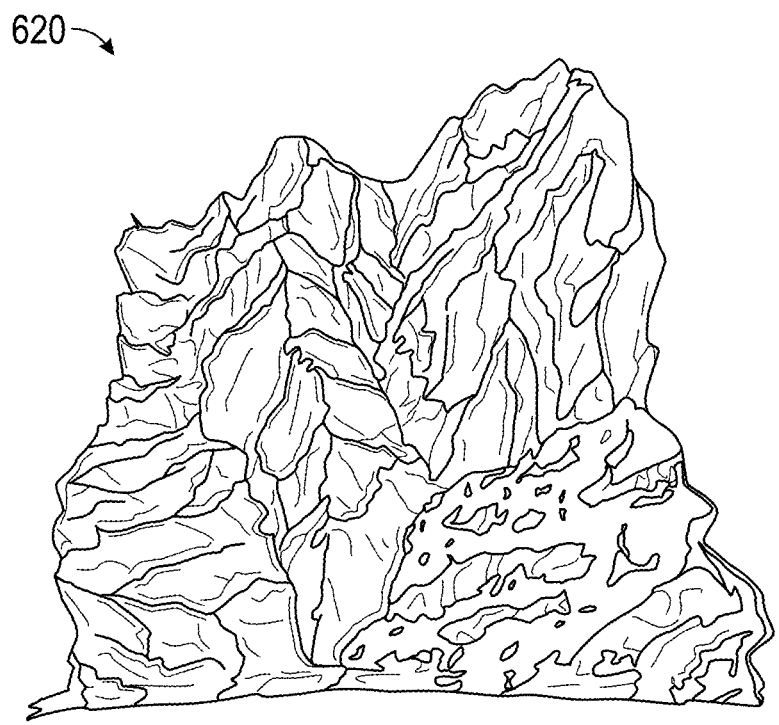
FIGS. 6C-6G illustrate an embodiment of modifying terrain features using the terrain generation system.
Figure 6D:
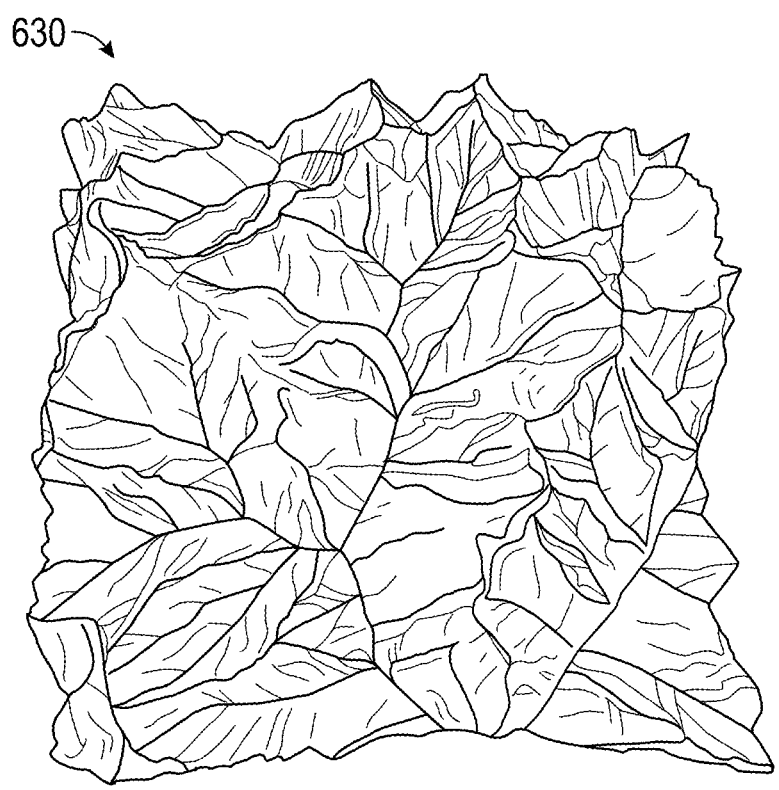
Figure 6E:
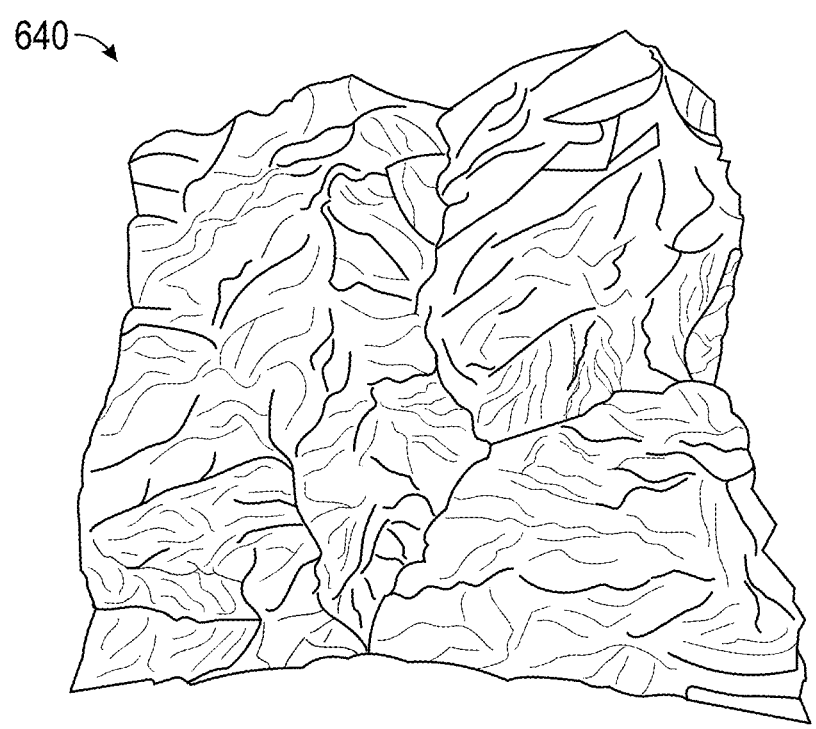
Figure 6F:
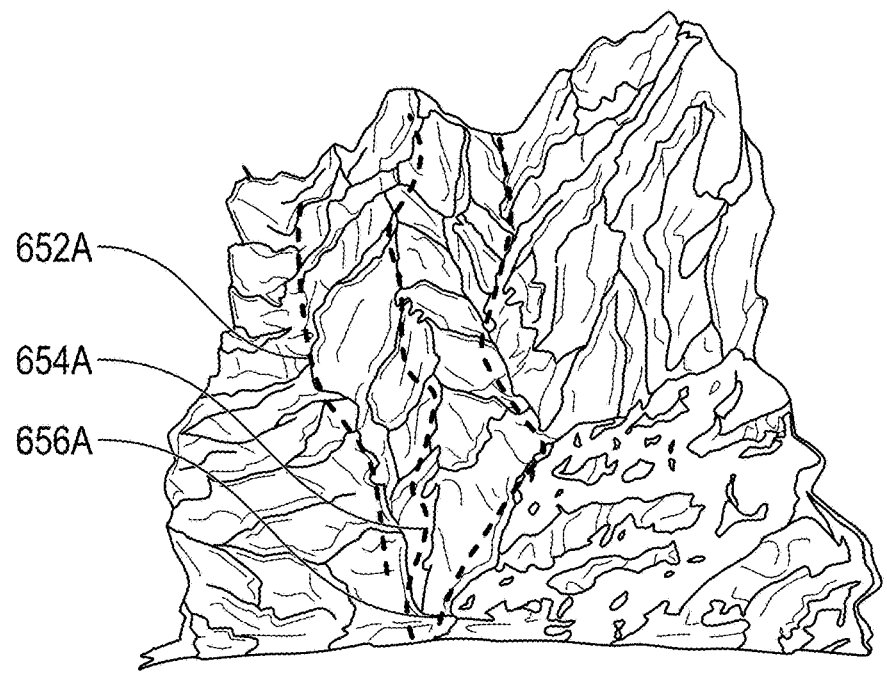
Figure 6G:
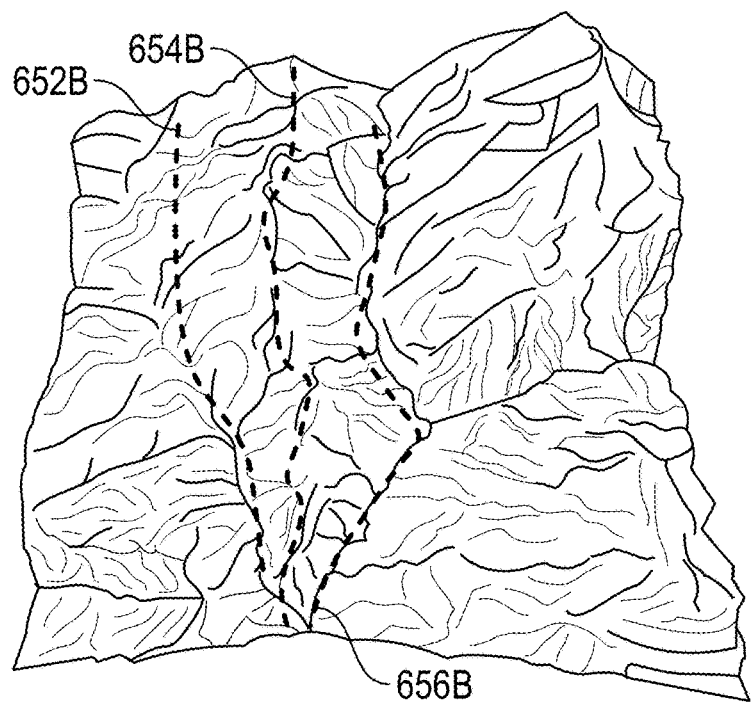

FIG. 6C is an embodiment of a first terrain type and FIG. 6D is an embodiment of a second terrain type. The terrain types may be the same or different biomes. The terrain generation system can generate machine learning models for each of the terrain types. FIG. 6E illustrates an embodiment of existing terrain of the first terrain type and FIG. 6F illustrates an embodiment of existing terrain of the second terrain type. The area includes certain height formations 652A, 654A, 656A. The terrain generation system can map the landform characteristics of the first terrain type onto the height formations 652A, 654A, 656A to generate the same (or similar) height formations 652A, 654A, 656A but with landform characteristics of the first terrain type, as illustrated in the embodiment of FIG. 6G.

Applying Transition to Different Terrain Style Boundaries

Figure 7:
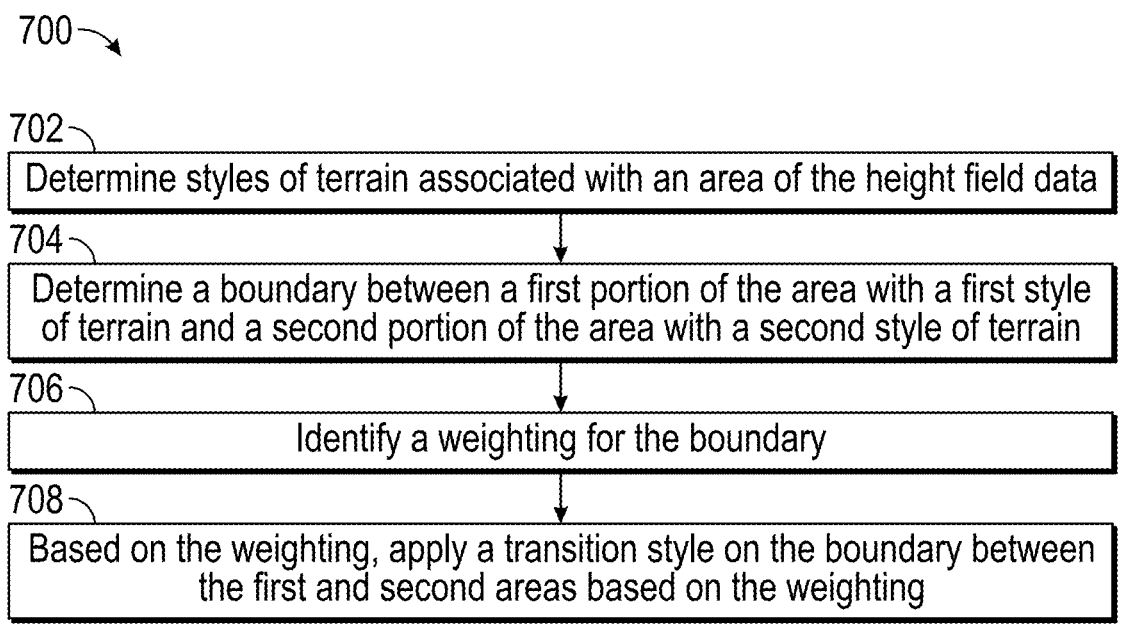
FIG. 7 illustrates an embodiment of a flow diagram for applying a transition to different terrain style boundaries.

FIG. 7 illustrates an embodiment of a flow diagram 700 for applying a transition to different terrain style boundaries. The process 700 can be implemented by any system that can change a terrain style of an area. For example, the process 700, in whole or in part, can be implemented by the height field synthesizer 103, the height field amplifier 108, the height field composer 106, or other computing system. Although any number of systems, in whole or in part, can implement the process 700, to simply discussion, the process 700 will be described with respect to particular systems. Further, although embodiments of the process 700 may be performed with respect to variations of systems comprising various game development environments, to simply discussion, the process 700, will be described with respect to the terrain generation system.

At block 702, the terrain generation system can determine styles of terrain associated with an area of the height field data. For example, a left portion can be associated with a mountainous style biome and the right portion to an open field style biome. At block 704, the terrain generation system can determine a boundary between a first portion of the area with a first style of terrain and a second portion of the area with a second style of terrain.

At block 706, the terrain generation system can identify a weighting for the boundary, and at block 708, the terrain generation system can apply a transition style on the boundary between the first and second areas based on the weighting to produce a realistic mixed-biome terrain. In some embodiments, the natural transitions along the boundaries are generated using Poisson image editing and/or LIDAR data.

Figure 8A:
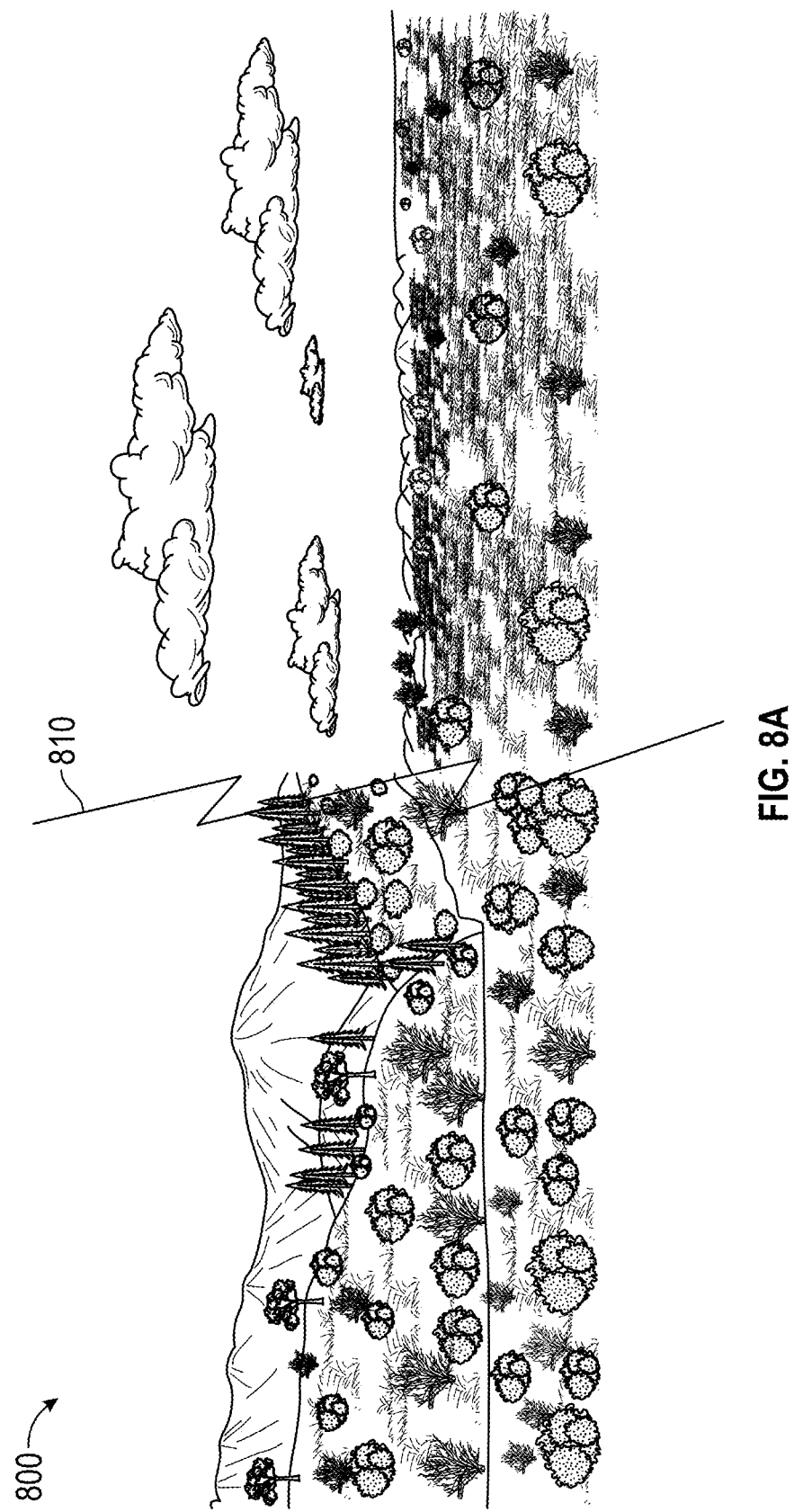
FIG. 8A illustrates an embodiment of two biomes with a boundary.

FIG. 8A illustrates an embodiment 800 of two biomes with a boundary. The left side can be a mountainous style biome and the right side can be an open field biome. The boundary 810 can be located at the intersection of the two biome styles.

Figure 8B:
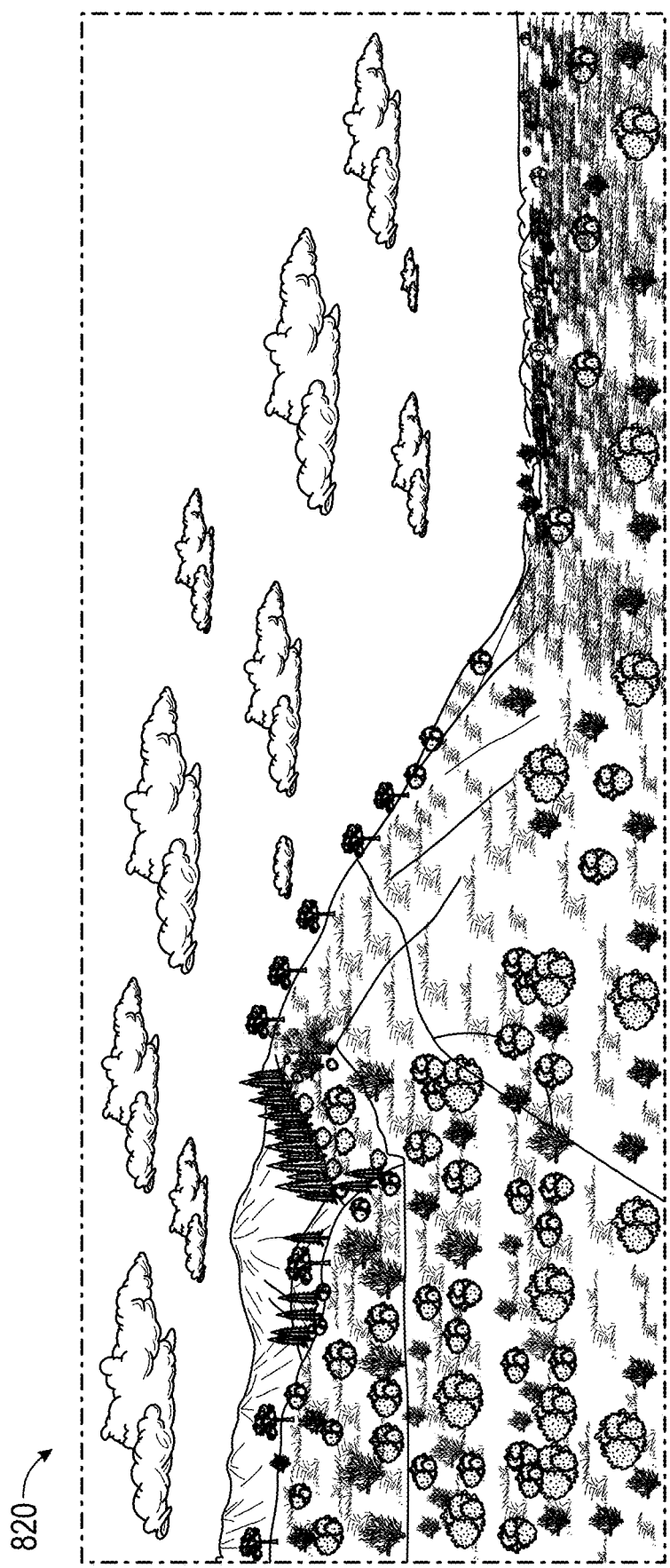
FIG. 8B illustrates an embodiment of two biomes with a natural transition.

FIG. 8B illustrates an embodiment of two biomes with a natural transition. The mountainous region on the left tapers off to the open field on the right.

FIG. 9A illustrates an example of a mountainous region 900 that is scaled to generate a larger sized region 930. Using a scaling factor to generate larger terrain can result in unrealistic terrain characteristics. For example, the hill 902 in the mountainous region 900 is also scaled to become a larger hill 932 for the larger sized region 930. The trees and person of the mountainous region 900 also became larger for the larger sized region 930. For example, a region may be scaled to be 10 times larger. Then, a tree that is 50 feet tall may be unrealistically scaled to now be 500 feet tall.

FIG. 9B illustrates an embodiment of characteristics of a mountainous region 900 applied to a larger sized region 930 while maintaining size relationships of the landform characteristics. The relative size of the hill 902 in the mountainous region 900 is maintained, even when the style is applied to a larger sized region 960. In the larger sized region 960, the hills 962A, 962B, 962C, 962D, 962E, 962F, 962G, 962H, 962I, 962J, 962K are all relatively the same (or substantially similar) size as the mountainous region 900 but applied to a larger region. The size of the trees and person of the mountainous region 900 also are relatively the same (or substantially similar) size for the larger sized region 960.

Overview of Computing Device

Figure 10:
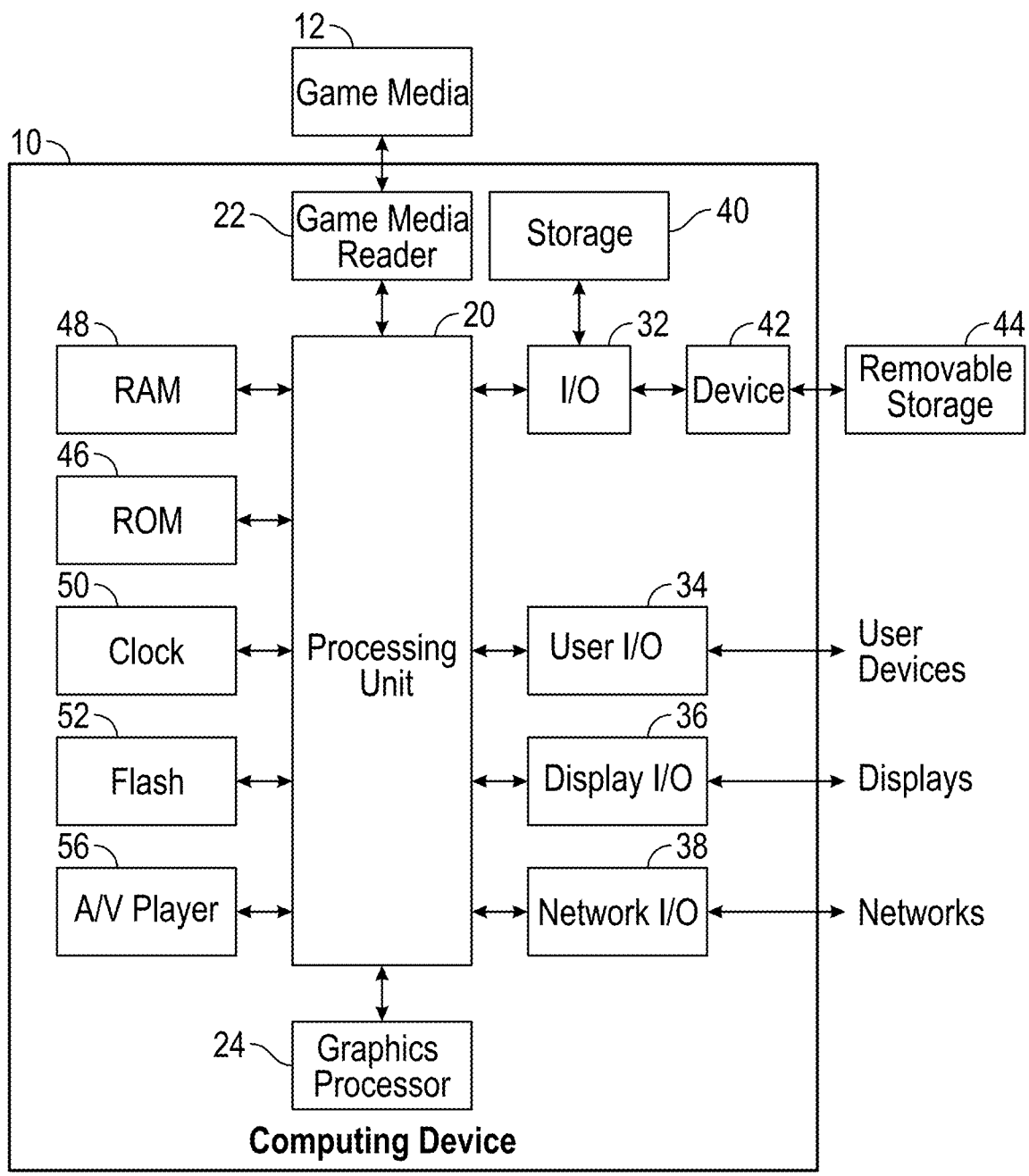
FIG. 10 illustrates an embodiment of computing device.

FIG. 10 illustrates an embodiment of computing device 10. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the terrain generation is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of terrain generation, and/or generation of a biome model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for generating game terrain data of a game application within a graphical user interface, wherein the method includes:

generating instructions to display a graphical user interface on a user computing system, the graphical user interface comprising a drawing interface for a user to generate graphical inputs, wherein each type of graphical input is associated with a terrain characteristic;

receiving, from the user system, a two-dimensional terrain drawing through the drawing interface for generation of a first terrain area, the two-dimensional terrain drawing including, at least, a first graphical input and a second graphical input, wherein the first graphical input corresponds to a first terrain characteristic and the second graphical input corresponds to a second terrain characteristic;

receiving, from the user system, a selection of a first style of terrain for the first terrain area;

inputting the two-dimensional terrain drawing into a neural network, wherein the neural network is trained to translate the two-dimensional terrain drawing into height field data for the first style of terrain, wherein the height field data comprises first height field data associated with the first terrain characteristic based on the first graphical input and second height field data associated with the second terrain characteristic based on the second graphical input;

receiving an output of the neural network that includes a first height field for the first terrain area generated based at least in part on the first height field data and the second height field data, wherein the first height field for the first terrain area corresponds to a relationship between a first height associated with the first terrain characteristic and a second height associated with the second terrain characteristic; and generating a three dimensional game terrain model based on the first height field and the first style of terrain.

2. The method of claim 1, wherein the first style of terrain includes one or more landform details specific to a first biome.

3. The method of claim 2, wherein generating the three dimensional game terrain model includes applying the first style of terrain to the first height field data.

4. The method of claim 3, wherein the method further comprises:
   receiving, from the user system, a selection of a second terrain area; and
   applying a second terrain style to the second terrain area, wherein the second terrain style includes one or more landform details specific to a second biome.

5. The method of claim 4, wherein the method further comprises:
   identifying a boundary of the second terrain area; and
   generating a transition between the first biome and the second biome at the boundary.

6. The method of claim 5, wherein generating the transition is based on a weighting.

7. The method of claim 5, wherein generating the transition is based on a poisson image editing.

8. The method of claim 1, wherein the terrain characteristic includes a height.

9. The method of claim 1, wherein the user system generates the graphical inputs onto a 2-dimensional representation of the area.

10. The method of claim 1, wherein each of the graphical inputs correspond to a specific color.

11. A system for generating game terrain data of a game application within a graphical user interface, wherein the system includes:
   one or more processors configured with computer executable instructions that configure the one or more processors to:
      generate instructions to display a graphical user interface on a user computing system, the graphical user interface comprising a drawing interface for a user to generate graphical inputs, wherein each type of graphical input is associated with a terrain characteristic;
      receive, from the user system, a two-dimensional terrain drawing through the drawing interface for generation of a first terrain area, the two-dimensional terrain drawing including, at least, a first graphical input and a second graphical input, wherein the first graphical input corresponds to a first terrain characteristic and the second graphical input corresponds to a second terrain characteristic;
      receive, from the user system, a selection of a style of terrain for the first terrain area;
      input the two-dimensional terrain drawing into a first machine learning model, wherein the first machine learning model is trained to translate the two-dimensional terrain drawing to first height field data associated with the first terrain characteristic based on the first graphical input for the style of terrain and to second height field data associated with the second terrain characteristic based on the second graphical input for the first style of terrain;
      receive an output of the first machine learning model that includes a first height field for the first terrain area generated based at least in part on the first graphical input and the second graphical input, wherein the first height field for the first terrain area corresponds to a relationship between a first height associated with the first terrain characteristic and a second height associated with the second terrain characteristic; and
      generate a three dimensional game terrain model based on the first height field and the style of terrain.

12. The system of claim 11, wherein the first machine learning model includes a neural network.

13. The system of claim 11, wherein the first machine learning model is trained using predefined inputs for desired heights and an expected height field output.

14. The system of claim 13, wherein the first machine learning model is trained using back propagation.

15. The system of claim 13, wherein the first machine learning model is trained using LIDAR data.

16. The system of claim 11, wherein the first machine learning model is trained for a plurality of biomes.

17. The system of claim 11, wherein the first machine learning model is used for a first biome and a second machine learning model is used for a second biome.

18. A non-transitory computer-readable storage medium having stored thereon instructions that, when executed, cause at least one processor to:
   generate instructions to display a graphical user interface on a user computing system, the graphical user interface comprising a drawing interface for a user to generate graphical inputs, wherein each type of graphical input is associated with a terrain characteristic;
   receive, from the user system, a two-dimensional terrain drawing through the drawing interface for generation of a first terrain data, the two-dimensional terrain drawing including, at least, a first graphical input and a second graphical input, wherein the first graphical input corresponds to a first terrain characteristic and the second graphical input corresponds to a second terrain characteristic;
   receive, from the user system, a selection of a style of terrain for the first terrain area;
   input the two-dimensional terrain drawing into a machine learning model, wherein the machine learning model is trained to translate the two dimensional terrain drawing to first height field data associated with the first terrain characteristic based on the first graphical input for the style of terrain and to second height field data associated with the second terrain characteristic based on the second graphical input for the first style of terrain;
   receive an output of the first machine learning model that includes a first height field for the first terrain area generated based at least in part on the first height field data and the second height field data, wherein the first height field for the first terrain area corresponds to a relationship between a first height associated with the first terrain characteristic and the second height associated with the second terrain characteristic; and
   generate a three dimensional game terrain model based on the first height field and the style of terrain.

19. The non-transitory computer-readable storage medium of claim 18, wherein the first machine learning model is used for a first biome and a second machine learning model is used for a second biome.

20. The non-transitory computer-readable storage medium of claim 18, wherein to generate the three dimensional game terrain model includes maintaining relative sizes of landform characteristics for the style of terrain.

* * * * *

UNITED STATES PATENT AND TRADEMARK OFFICE
CERTIFICATE OF CORRECTION

PATENT NO. : 10,922,882 B2
APPLICATION NO. : 16/271655
DATED : February 16, 2021
INVENTOR(S) : Han Liu et al.

Page 1 of 1

It is certified that error appears in the above-identified patent and that said Letters Patent is hereby corrected as shown below:

On the Title Page

In Column 1, item (73), Assignee, Line 1, delete "Electronics" and insert --Electronic--.

In the Drawings

In sheet 2 of 18, FIG. 2, reference numeral 204, Line 2, delete "characterstics" and insert --characteristics--.

In the Specification

In Column 10, Line 9, delete "a the" and insert --the--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*